(12) United States Patent
Krishnaswamy

(10) Patent No.: US 7,979,531 B2
(45) Date of Patent: Jul. 12, 2011

(54) METHOD AND SYSTEM FOR NETWORK MANAGEMENT DATA COLLECTION

(75) Inventor: Ramaswamy Krishnaswamy, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 927 days.

(21) Appl. No.: 11/350,956

(22) Filed: Feb. 8, 2006

(65) Prior Publication Data

US 2007/0198680 A1   Aug. 23, 2007

(51) Int. Cl.
G06F 15/173 (2006.01)
G06F 9/445 (2006.01)
G06F 3/00 (2006.01)
G06F 9/44 (2006.01)
G06F 9/46 (2006.01)
G06F 13/00 (2006.01)

(52) U.S. Cl. ........ 709/224; 717/176; 717/177; 717/178; 719/330

(58) Field of Classification Search .................... 709/224
See application file for complete search history.

(56) References Cited

U.S. PATENT DOCUMENTS

| | | | |
|---|---|---|---|
| 6,754,703 | B1 | 6/2004 | Spring |
| 2003/0115309 | A1* | 6/2003 | Mann et al. ............ 709/223 |
| 2003/0191795 | A1* | 10/2003 | Bernardin et al. ........ 709/105 |
| 2004/0019897 | A1* | 1/2004 | Taylor et al. ............ 719/330 |
| 2004/0117358 | A1* | 6/2004 | von Kaenel et al. ........... 707/3 |
| 2004/0236860 | A1* | 11/2004 | Logston et al. ............ 709/230 |
| 2005/0021311 | A1* | 1/2005 | Deb et al. ............... 702/188 |
| 2005/0228880 | A1* | 10/2005 | Champlin .............. 709/224 |
| 2006/0277305 | A1* | 12/2006 | Bernardin et al. ......... 709/226 |
| 2007/0078858 | A1* | 4/2007 | Taylor et al. ............ 707/10 |
| 2007/0106984 | A1* | 5/2007 | Olsen et al. ............ 717/174 |

OTHER PUBLICATIONS

"Tree Rerooting in Distributed Garbage Collection: Implementation and Performance Evaluation". Luc Moreeau. Higher-Order and Symbolic Computation, 2002 Kluwer Academic Publishers.*
Brian Tierney, et al., "A Grid Monitoring Service Architecture", Global Grid Forum Performance Working Group, 2001.
Rajkumar Buyya, "Grid Computing Info Centre (GRID Infoware)"Aquired at: http://www.gridcomputing.com/ 9 pages.
"Using the Cisco CNS PerfE Web Interface", 24 pages, Chapter 3—Cisco CNS Performance Engine User Guide, OL-3227-02.

* cited by examiner

*Primary Examiner* — Ashok B Patel
*Assistant Examiner* — Kevin Bechtel
(74) *Attorney, Agent, or Firm* — Fish & Richardson P.C.

(57) ABSTRACT

Methods and systems for network management data collection have been provided. Underutilized computers in the network are allocated as a Network Management Data Collection Client (NMDCC) to collect network management data. The NMDCC receives program files from the network management server. The received program files are downloaded by the NMDCC in a compressed manner via a web service. The downloaded program files are executed for collecting the Network Management Data (NMD). The collected NMD is updated back on the network management server. The downloaded program files are discarded when the NMDCC is not collecting the network management data.

20 Claims, 4 Drawing Sheets

METHOD AND SYSTEM FOR NETWORK MANAGEMENT DATA COLLECTION

BACKGROUND OF THE INVENTION

1. Field of Invention

Embodiments of the present invention relate in general to network management data collection and more specifically to methods and systems for distributed network management data collection.

2. Description of the Background Art

Network management is a process for monitoring and controlling networks. A network administrator uses a variety of tools, application, and devices for network management. These applications, such as Network Management Application (NMA), and devices, such as a Network Management (NM) server, collect the Network Management Data (NMD). NMD includes, for example, configuration management, fault management, performance management, security management and accounting management. NMD is required by a network administrator, to measure and check various aspects of the functioning of the network, such as the network performance. For example, configuration management data is required to monitor network and system configuration information. This information helps in tracking and managing the operation of various hardware and software elements in the network.

The collection of NMD requires high usage of processing capacity and memory of the NM server that facilitates this collection. Therefore, collection of NMD is considered as resource intensive. For this purpose, users have to invest in high-end servers to be used as NM servers. Further, users may require upgrading their hardware to achieve scalability and performance, if the network is upgraded or modified.

DETAILED DESCRIPTION OF EMBODIMENTS OF THE INVENTION

Figure 1:
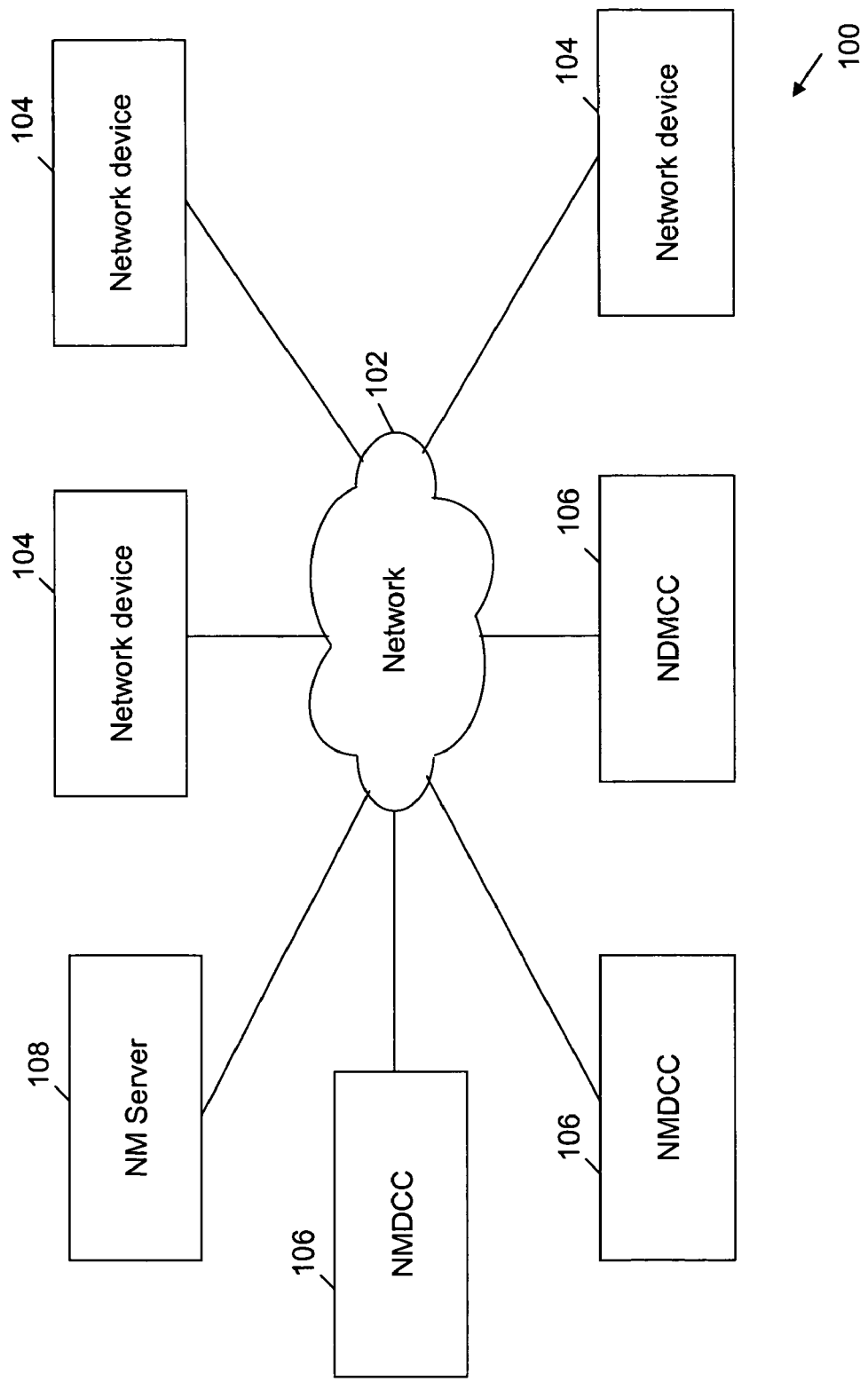
FIG. 1 illustrates a network environment for network management data collection, in accordance with an embodiment of the present invention.

Embodiments of the present invention provide for distributed Network Management Data (NMD) collection. In the description herein for embodiments of the present invention, numerous specific details are provided, such as examples of components and/or methods, to present a thorough understanding of embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A preferred embodiment of the invention allows the task of Network Management Data (NMD) collection to be facilitated by using compressed program files. The program files are distributed to underutilized computers in the network for processing. This type of "grid" computing approach can allow a network to perform effective Network Management (NM) by using Network Management Applications (NMAs) that would otherwise be idle or have underutilization to process the program files and obtain the needed Network Management Data (NMD).

A network administrator uses NMD collected by the NM server to monitor and control a network. NMD includes, for example, inventory, configuration, syslog, security, accounting, fault and performance related information, etc. NMD is required by the network administrator, for example, to measure and check various aspects of the functioning of the network, such as the network performance. For example, configuration management data is used to monitor network and system configuration information. The collection of NMD requires high usage of processing capacity and memory of the NM server that facilitates this collection. Therefore, collection of NMD is a resource intensive task.

Embodiments of the present invention provide a way to help the NM server to collect the NMD with the help of underutilized or idle computers present in the network. In a preferred embodiment, an underutilized computer in the network is allocated the task of collecting NMD by an end user or a network administrator. A computer, which is connected in the network and is not being used by an end user, or is being underutilized in one or more ways, is considered an idle computer. Further, an end user can allocate the task of NMD collection to a computer that has idle capacity, or unutilized resources that may be sufficient to collect NMD. As the task of collecting the NMD is assigned to the underutilized computer, the resources of the underutilized computer are utilized for NMD collection. Such a computer that has been assigned the task of collecting NMD is hereinafter referred as a Network Management Data Collection Client (NMDCC).

The NM server that runs the NMA selects a set of program files from the NMA that are required to collect NMD by the NMDCC. Accordingly, the NM server makes the selected set of program files available in a compressed format. The NMDCC then polls the NM server for the required program files and downloads the required program files, via a web service. Consequently, the selected program files are executed and are invoked to collect the NMD from network devices in the network. Finally, the NMDCC sends the collected NMD to the NM server. This collected NMD is saved on the NM server and is used to update the NMD previously saved on the NM server.

Accordingly, the program files required for collecting the NMD need not be installed on all computers in the network at all times. The NM server dynamically allocates the program files, as and when required, to the underutilized computers that have been allocated the task of NMD collection. Further, embodiments of the present invention facilitate automatic installation of the program files required for NMD collection. Therefore, the time of the end user is not wasted in installing the program files each time an underutilized computer is allocated as an NMDCC. Further, if the NMDCC is allocated another task or is no longer assigned the task of collecting the NMD, it stops collecting NMD. In such a case, it no longer requires the program files downloaded for collecting the NMD. It then discards the downloaded program files from memory. Therefore, the memory of the computers that were allocated as NMDCCs is not wasted in saving programs that are no longer needed.

FIG. 1 illustrates network environment 100 for NMD collection, in accordance with an embodiment of the present invention. Network environment 100 includes network 102, a plurality of network devices 104, a plurality of NMDCCs 106, and NM server 108. Network devices 104, NMDCCs 106, and NM server 108 are all connected through network 102. Network devices 104 include computers, peripherals, routers, communication equipment, etc. NMD is collected from network devices 104.

In an embodiment of the present invention, the NMD is collected by computers among network devices 104 that are allocated to act as NMDCCs 106. In an embodiment of the present invention, underutilized computers among network devices 104 are allocated to act as NMDCCs 106 either by the end users of these computers or by the network administrator. Once an underutilized computer is allocated as an NMDCC, NM server 108 selects a set of program files required for collecting the NMD.

NM server 108 is a server that runs the NMA in network 102. NM server 108 stores the NMD and facilitates the network administrator to access the NMD. In an embodiment of the present invention, NM server 108 includes software that facilitates providing the NMD to the network administrator. NM server 108 selects program files required for collecting NMD from a library. The library is created for each NM application such as inventory, configuration, image management and performance. This library can be further fine tuned for network devices 104. The program files are picked up from the library based on the Network Management task and the network device. NM server 108 then provides NMDCCs 106 with the selected set of program files required to collect NMD from network devices 104. The set of program files are provided to NMDCCs 106 in a compressed file such as Java Archive (JAR) file via a web service.

NMDCCs 106 then poll NM server for the program files. NMDCCs 106 download program files from the provided set of program files. NMDCCs 106 then execute the downloaded program files to collect the NMD. Further, NMDCCs 106 sends the collected NMD to NM server 108. NM server 108 uses the received NMD to update the previously stored NMD.

Figure 2:
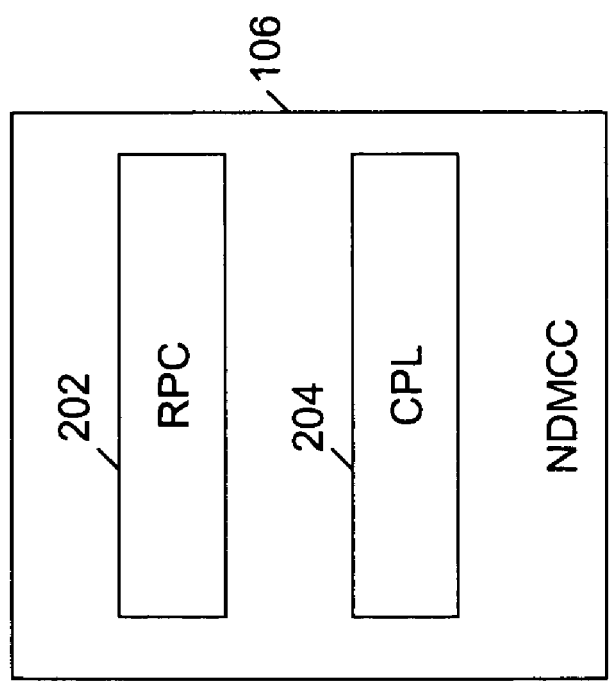
FIG. 2 illustrates a network management data collection client, in accordance with an embodiment of the present invention.

FIG. 2 illustrates an NMDCC from NMDCCs 106, in accordance with an embodiment of the present invention. Each NMDCC from NMDCCs 106 includes a Remote Procedure Call (RPC) 202, and a Customer Program Loader (CPL) 204. RPC 202 is a protocol that allows a program running on one computer to be executed on another computer, without the programmer explicitly selecting a program file.

An example of RPC 202 is a Simple Object Access Protocol (SOAP). SOAP is a lightweight, XML-based protocol for exchange of information in a decentralized, distributed environment. SOAP includes three parts: an envelope, a set of encoding rules and a convention for representing remote procedure calls and responses. The envelope defines a framework for describing the contents of a message and the method of processing the message. The set of encoding rules provide definition for expressing instances of application-defined data types. NMDCC invokes RPC 202 to poll NM server 108 for program files required to collect NMD. Further, the required program files are downloaded via RPC 202.

In an embodiment of the present invention, the program files are received in a compressed JAR file format via a web service as a byte stream. A JAR file includes various files, such as class, image, and sound files gathered into a single file and compressed for faster downloading to a web browser.

CPL 204 receives the set of program files via RPC 202. Further, CPL 204 selects the program files required to be executed from the received set of program files. The program files are selected by reading the manifest file of the JAR file. CPL 204 then loads the selected program files specified in the manifest file and calls its run method. The program files loaded by CPL 204 will use other program files specified in the JAR file to collect NMD. When the NMD is collected CPL 204 sends the NMD to NM server 108, which is updated with the collected NMD.

When the computer allocated as an NMDCC is no longer assigned the task of NMD collection, CPL 204 discards the downloaded program files from the memory of the computer.

Figure 3:
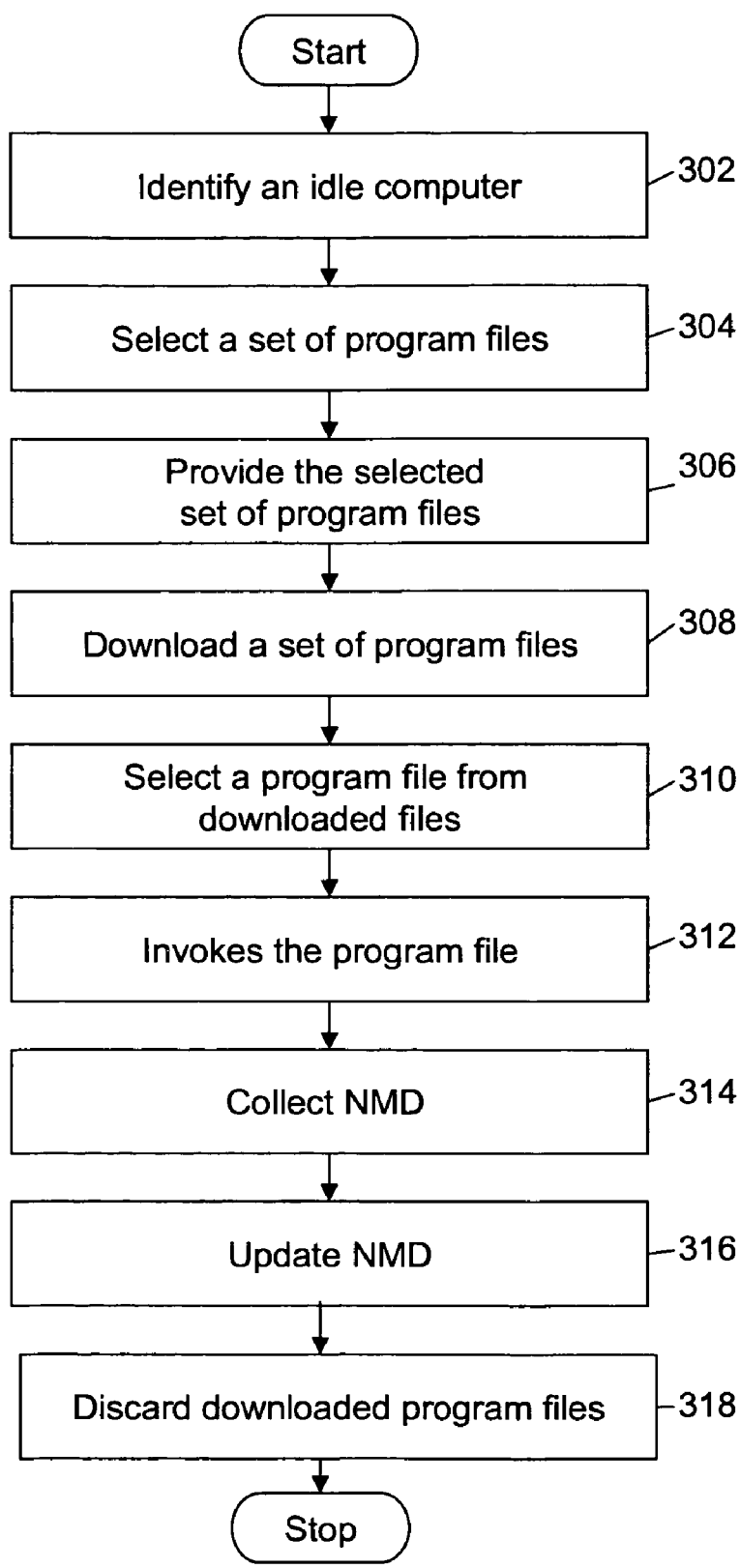
FIG. 3 is a flow chart illustrating a method for network management data collection, in accordance with an embodiment of the present invention.

FIG. 3 is a flowchart illustrating a method for NMD collection, in accordance with an embodiment of the present invention. At step 302, an underutilized computer in network 102 is identified. As described earlier, the underutilized computer can be identified by an end user or by the network administrator. The identified underutilized computer is then allocated as a NMDCC and is assigned the task of collecting the NMD from network devices 104. Once a computer is allocated as an NMDCC, at step 304, NM server 108 selects a set of program files required to collect the NMD from network devices 104. In accordance with an embodiment of the present invention, NM server 108 selects the set of program files from a library in the NMA. Subsequently, at step 306 the selected set of program files are provided to the NMDCC in a compressed format via a web service. At step 308, CPL 204 downloads the selected set of program files. The program files are downloaded in a compressed format via a web service. In an embodiment of the present invention, the program files are downloaded in a compressed JAR file format via RPC as a byte stream. In another embodiment of the present invention, the program files are downloaded in a compressed JAR file format via SOAP as a byte stream. Subsequently at step 310, CPL 204 selects a program file from the set of downloaded files by reading the manifest of the JAR file. At step 312, CPL 204 invokes the selected program file from the downloaded program files. The program file selected by CPL 204 can invoke other program files method specified in the manifest of the JAR file. At step 314, the NMDCC collects the NMD from network devices 104 with the help of the invoked program files. Once the NMD is collected, it is sent to NM server 108. At step 316, NM server 108 updates the previously stored NMD on the basis of the collected NMD.

The NMDCC continues to collect the NMD till it is assigned another task by the end user or the network administrator. Once the computer allocated as the NMDCC is assigned another task or it is no longer allocated as the NMDCC, the computer stops collecting NMD. It therefore, no longer requires the downloaded program files that are were required for collecting the NMD. Accordingly, at step 318, the downloaded program files are discarded from the memory of the computer when it is no longer allocated as the NMDCC.

Figure 4:
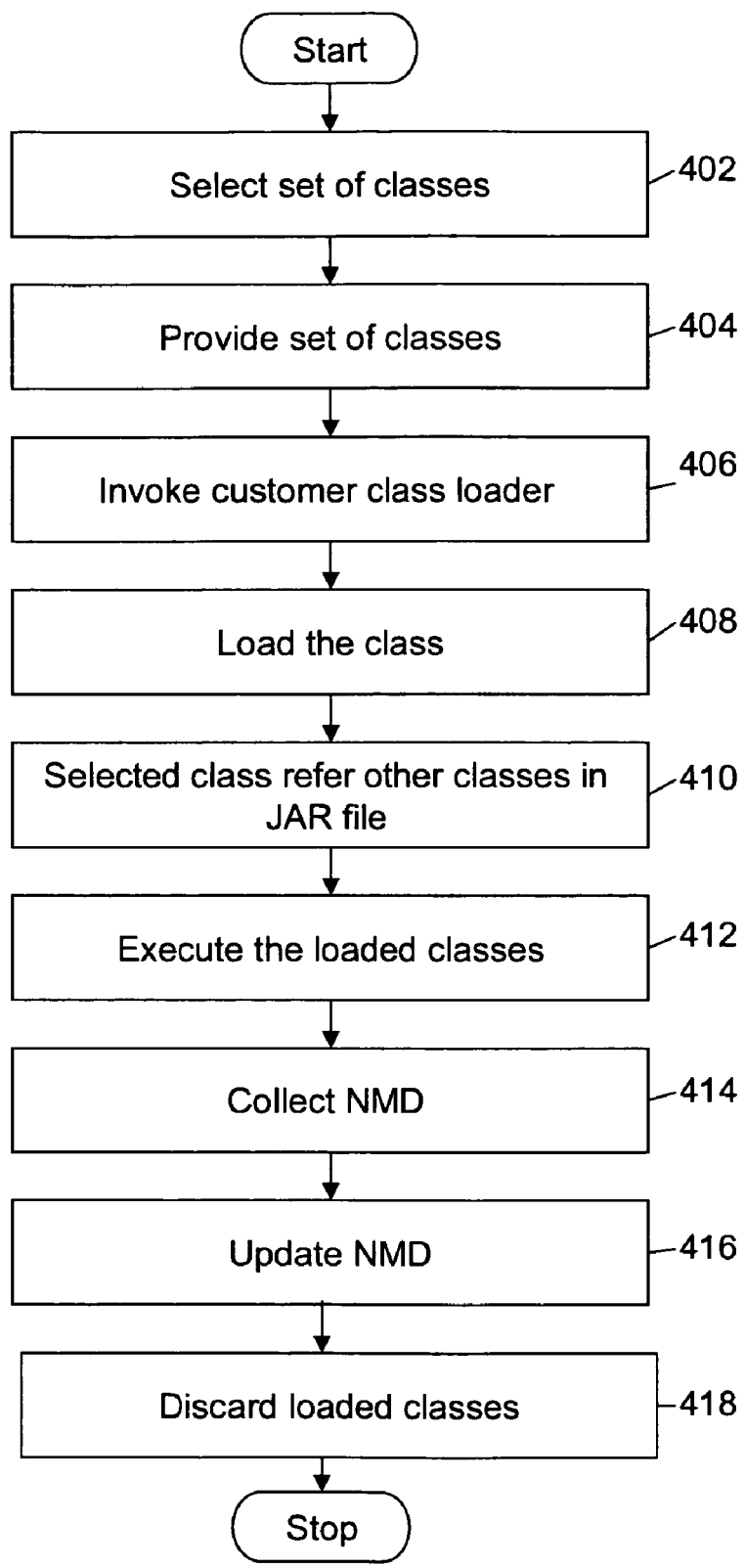
FIG. 4 is a flow chart illustrating a method for network management data collection, in accordance with an embodiment of the present invention.

FIG. 4 is a flow chart illustrating a method for NMD collection, in accordance with an embodiment of the present invention. In an embodiment CPL 204 included in the NMDCC is a custom class loader used for loading Java files. The NMDCC polls NM server 108 for program files to collect NMD. At step 402, NM server 108 selects a set of classes required by an NMDCC for collecting the NMD. Classes can be, for example, JAVA based software code. In an embodiment of the present invention, NM server 108 uses a lookup mechanism to identify the set of classes required for a given set of network devices 104. Subsequently at step 404, NM server 108 provides the selected set of classes in a JAR file format. At step 406, the custom class loader is invoked in the NMDCC. In an embodiment of the present invention, the custom class loader, when invoked, gets the JAR file using the web service via a byte stream. The custom class loader further reads the manifest of the received JAR file. Subsequently at step 408, based on the manifest of the JAR file, custom class loader selects and loads the class specified in the manifest of the JAR file. Further the run method of the loaded class is invoked. At step 410, the selected class refers to other classes mentioned in the JAR file. Subsequently at step 412, the classes are executed by invoking the methods required to collect the NM data. At step 414, the NMDCC collects the NMD from network devices 104 by the execution of the selected classes. Once the NMD is collected from network devices 104 the NMD is sent to NM server 108. At step 416, NM server 108 updates the previously stored NMD on the basis of the collected NMD.

As described earlier, the computer allocated as the NMDCC does not need the loaded classes once it has been assigned another task or is no longer allocated as the NMDCC. Accordingly, at step 418, the loaded classes are discarded from the memory of the NMDCC, if the computer is no longer allocated as the NMDCC.

In accordance with an embodiment of the present invention, the use of underutilized computers present for the purpose of NMD collection increases the scalability of the NMD collection network. Further, it also reduces the need for users to make use of multiple high-end servers for the collection of NMD. Therefore, the users do not require license for multiple installations of the entire NMA. Since only some program files from the entire NMA are used by the NMDCCs to collect the NMD, any computer on the network can act as an NMDCC. Therefore, multiple high-end servers are not required for NMD collection.

In accordance with an embodiment of the present invention, program files or classes required to collect the NMD are determined in runtime and are dynamically allocated by the NM server. Therefore, the end user or administrator does not need to spend time in determining and installing the program files required to collect the NMD.

In accordance with an embodiment of the present invention, the program files used for NMD collection are kept in the memory of the computer allocated as an NMDCC only as long as they are required. Once the computer stops collecting and transmitting the NMD, the program files are discarded from its memory. Hence, the memory of the computers allocated as the NMDCCs is not wasted.

In accordance with an embodiment of the present invention, underutilized computers in the network are determined by the end users or the network administrator. Such underutilized computers are allocated as NMDCCs and assigned the task of collecting the NMD. Once a computer is allocated as an NMDCC, the NM server, that runs the NMA, selects the program files for collecting the NMD. The NMDCC polls the NM server and receives the program files in a compressed format. The program files are downloaded on the NMDCC and executed to collect the NMD. The NMD thus collected by the NMDCC is sent to the NM server. Further, the NMD saved on the NM server is updated based on the sent NMD. The updates to the NM server can be made on a per network device basis or after a set of network devices based on the critical nature of data collected. If it is done on a per device basis then even when the computers are no longer allocated as NMDCCs, only the NMD pertaining to the current network device may be lost. For non-critical data collection the NMD collection from that network device can be repeated using another underutilized computer.

According to embodiments of the present invention, a method for network management data collection is provided. The network is coupled to an underutilized computer, a network device, and a network management server, wherein the network management data is collected from the network device, the network management server includes program files to be used for collection of network management data collection, the underutilized computer is assigned the task of collecting network management data. The method comprises downloading a program file to the underutilized computer from the network management server; executing the downloaded program file with the underutilized computer to obtain network management data; collecting network management data from the network device; and sending the network management data to the network management server.

In another embodiment of the present invention, a method for network management data collection is provided. The network is coupled to an underutilized computer, a network device, and a network management server, wherein the network management data is collected from the network device, the network management server includes program files to be used for collection of network management data collection, the underutilized computer is assigned the task of collecting network management data and includes a custom class loader. The method comprises invoking the custom class loader; polling the network management server for Java Archive (JAR) files, wherein the network management server is polled by the invoked custom class loader; receiving a JAR file; reading the manifest of the received JAR file; determining a class to be executed based on the manifest of the JAR file; loading the determined class; executing the determined class by invoking a run method of the determined class; collecting the network management data by the execution of the determined class; and sending the collected network management data to the network management server.

In yet another embodiment of the present invention, a system for network management data collection is provided. The system comprises a network device in a network; an underutilized computer, wherein the underutilized computer is assigned the task to collect network management data from the network device and send the collected network management data; and a network management server, wherein the network management server is adapted to select and provide a program file for collecting the network management data from the network device, and receive the network management data sent by the computer.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C++, Java etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer-readable medium' for purposes of embodiments of the present invention may be any medium that can contain and store the program for use by or in connection with the instruction execution system, apparatus, system or device. The computer-readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", an and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for network management data collection, wherein a network is coupled to an underutilized computer, a network device, and a network management server, the method comprising:
   identifying the underutilized computer by determining that the underutilized computer has at least a predetermined amount of available capacity sufficient for collecting network management data;

allocating, by a user, the underutilized computer for collecting network management data from the network device;

downloading to a memory of the underutilized computer and from the network management server via a web service, a set of program files to be used in the underutilized computer for collecting the network management data from the network device;

selecting a program file from the set of downloaded program files in the underutilized computer;

executing the selected program file using the underutilized computer to obtain the network management data from the network device;

collecting, in the underutilized computer, the network management data from the network device;

sending the collected network management data from the underutilized computer to the network management server;

receiving an indication that the underutilized computer is allocated to a task other than collecting and sending the network management data;

stopping, upon receiving the indication, the collecting and sending of the network management data; and upon stopping the collecting and sending of the network management data, discarding the set of program files from the memory of the underutilized computer.

2. The method of claim 1, further comprising:
automatically installing the set of program files on the underutilized computer after the downloading.

3. The method of claim 1, further comprising:
receiving the collected network management data in the network management server; and
updating previously stored network management data in response to the received network management data.

4. The method of claim 1, further comprising:
selecting the set of program files for collecting the network management data, wherein the set of program files is selected by the network management server; and
providing the selected set of program files to the underutilized computer that is allocated for collecting network management data.

5. The method of claim 4, wherein the providing the selected set of program files to the underutilized computer that is allocated for collecting network management data comprises accessing a library based on a network management application.

6. The method of claim 1, wherein the user that allocates the underutilized computer comprises an end user of the underutilized computer.

7. The method of claim 1, wherein the set of program files downloaded from the web service are in a compressed format, wherein the collected network management data comprises information related to inventory, configuration, syslog, security, accounting, fault, and performance.

8. The method of claim 4, wherein the providing the selected set of program files comprises providing a Java Archive (JAR) file via Remote Procedure Calling (RPC).

9. The method of claim 4, wherein the providing the selected set of program files comprises providing a Java Archive (JAR) file via Simple Object Access Protocol (SOAP) as a byte stream.

10. The method of claim 1, wherein the user that allocates the underutilized computer comprises a network administrator of the network.

11. A method for network management data collection, wherein a network is coupled to an underutilized computer, a network device, and a network management server, the method comprising:

identifying the underutilized computer by determining that the underutilized computer has at least a predetermined amount of available capacity sufficient for collecting network management data;

allocating, by a user, the underutilized computer for collecting network management data for the network device, wherein the underutilized computer comprises a custom class loader;

invoking the custom class loader in the underutilized computer;

polling the network management server for Java Archive (JAR) files, wherein the network management server is polled by the invoked custom class loader of the underutilized computer;

receiving a JAR file comprising classes in the underutilized computer;

reading a manifest of the received JAR file in the underutilized computer;

determining a class from the received classes to be executed based on the manifest of the JAR file;

loading the determined class;

executing the determined class by invoking a run method of the determined class;

collecting the network management data from the network device by the execution of the determined class in the underutilized computer;

sending the collected network management data from the underutilized computer to the network management server;

receiving an indication that the underutilized computer is allocated to a task other than collecting and sending the network management data;

stopping, upon receiving the indication, the collecting and sending of the network management data; and upon stopping the collecting and sending of the network management data, discarding the loaded class from the underutilized computer.

12. The method of claim 11, further comprising reading the manifest of the received JAR file using a custom class loader.

13. The method of claim 11, further comprising receiving the JAR file as a byte stream via a Remote Procedure Calling (RPC), wherein the collected network management data comprises information related to inventory, configuration, syslog, security, accounting, fault, and performance.

14. The method of claim 11, further comprising receiving the JAR file as a byte stream via a Simple Object Access Protocol (SOAP) web service.

15. The method of claim 11, wherein the determined class uses other classes in the received JAR file to collect the network management data from the network device.

16. The method of claim 12, further comprising:
identifying a set of classes required for the network management data collection, wherein the network management server identifies the set of classes;
making available the set of classes as the JAR file;
transmitting the JAR file to the underutilized computer; and
receiving the network management data collected by the underutilized computer.

17. A system for network management data collection, the system comprising:

a network device in a network;

an underutilized computer coupled to the network, wherein the underutilized computer is configured to receive an indication to be identified by determining that the underutilized computer has at least a predetermined amount of available capacity sufficient for collecting network management data, the underutilized computer being configured to:

be allocated by a user to collect network management data from the network device, and to provide the collected network management data;

receive a download to a memory of the underutilized computer, from a network management server via a web service, a set of program files to be used in the underutilized computer for collecting the network management data from the network device;

select a program file from the set of downloaded program files;

execute the selected program file using the underutilized computer to obtain the network management data from the network device;

collect the network management data from the network device;

send the collected network management data from the underutilized computer to the network management server;

receive an indication that the underutilized computer is allocated to a task other than collecting and sending the network management data;

stop, upon receiving the indication that the underutilized computer is allocated to the task other than collecting and sending the network management data, the collecting and sending of the network management data; and upon stopping the collecting and sending of the network management data, discard the set of program files from the memory of the underutilized computer; and the network management server coupled to the network, wherein the network management server is configured:

to select and provide the set of program files to the underutilized computer for collecting the network management data from the network device, and to receive the network management data provided by the underutilized computer.

18. The system of claim 17, wherein the underutilized computer further comprises:

a Customer Program Loader (CPL), wherein the CPL is configured for downloading and executing at least one of the program files; and a Remote Procedure Calling (RPC), wherein the RPC is configured to download the set of program files, wherein the received network management data comprises information related to inventory, configuration, syslog, security, accounting, fault, and performance.

19. The system of claim 17, wherein the user that allocates the underutilized computer comprises an end user of the underutilized computer.

20. The system of claim 17, wherein the user that allocates the underutilized computer comprises an administrator of the network.

* * * * *